Patented Aug. 6, 1935

2,010,227

UNITED STATES PATENT OFFICE 2,010,227

SHELLAC COMPOSITION CONTAINING A POLYCARBOXYLIC ORGANIC ACID OR ITS ANHYDRIDE

William Howlett Gardner, New York, N. Y., assignor to United States Shellac Importers Association, Inc., a corporation of New York No Drawing. Application October 27, 1932, Serial No. 639,849

6 Claims. (Cl. 260—2)

This invention relates to an improved composition of matter incorporating a resin, shellac being preferred, methods of producing it, and improved articles made therefrom. The principal object of this invention, though by no means confined to it, is to form a hard composition which can be used for plastic mouldings or for protective purposes, such as coatings, that has a fusion or softening point considerably higher than compositions that have been prepared from the same base materials.

It is well known that shellac belongs to the heat convertible type of resins, and affords one of the best materials for a base in plastic compositions for moulding purposes. Moulded articles prepared from shellac are the best known insulators for very high voltage service. One disadvantage in the use of shellac is the fact that most of its products have relatively low temperatures of fusion or softening under the application of heat, which is a marked disadvantage when certain engineering and safety features are considered.

From what is known of the chemistry of shellac, this resin is a natural condensation product of polyhydroxyl acids and is of the heat convertible type. In the heat conversion of an insoluble product, undoubtedly some condensation takes place between the uncombined carboxyl groups in the resin and the free hydroxyl groups to give resin molecules of greater size and complexity. The number of free or uncombined acid carboxyl groups in shellac in relation to the number of hydroxyl groups is limited. Usually they occur in the ratio of 1 to 5. It can be readily seen that if a substance as a polybasic acid or its anhydride is added to shellac and heat employed to promote the reaction, the added substance can act as connecting links between two shellac molecules and the chances of forming more complex and larger molecules of resin is greatly enhanced. Chemicals having but one active group do not possess this linking property and the increase in molecular weight resulting from the condensation of such substance with shellac is limited to the increase which can be obtained by the addition of their own molecular weight. Physical properties of substances vary with their molecular aggregation. An increase of melting or softening point usually accompanies increase in molecular size.

According to my invention, I may add polybasic acids such as phthalic acid, tetrachlorphthalic acid and succinic acid to the resinous material, shellac, in the example below, and subjecting the same to heat, or heat and pressure, according to the product desired, in order to form a binding or base material, or a hard, resistant object, for example, a moulded object, the point of fusion of which is substantially raised over the resin in its original form.

Improved shellac compositions have been prepared by the addition of certain so-called hardening agents (U. S. Patents 1,673,803; 1,673,804; 1,673,805; 1,673,806; 1,673,807; 1,673,808). It is believed these agents such as guanidines, aldehyde ammonia, aminonaphthalene, aromatic secondary amines, and phenols form condensation products with shellac. The exact chemical mechanism is unknown. It is, however, clear and can readily be confirmed that these compounds are limited to about one per cent (1.0%) in the effective amounts which can be used. The maximum amount in no way corresponds chemically to any known total number of chemical group or groups in shellac. Hence, the degree of improvement which can be obtained by such chemicals is decidedly limited in their range of effect, and for certain aforementioned engineering uses, such compositions are unable to meet the demand.

As an example of my invention, a mixture of nine pounds of asbestos, three pounds of shellac and two ounces phthalic-anhydride is rapidly passed and re-passed between hot rolls maintained at a temperature sufficient to keep the shellac in the composition plastic. When the mixture in this manner has been rendered uniform in distribution, the resulting plastic mass may be pressed into slabs, or so-called biscuits of any desired type or shape. These biscuits may then, if desire, be subjected to a heat curing or baking process. The exact details and conditions of any such intermediate step will, to a large extent, depend upon the nature and service to which the later manufactured article is to be put. This product may then be placed in a mould either in biscuit (by softening on a steam table) or in a powdered form, and subjected to required heat and pressure necessary for forming a hard, insoluble, less fusible object. Where a limited amount of agent and previous heat treatment of the biscuit material has been employed, it may be necessary to cool the mould during the pressing operation. The moulding may take place in a number of ways, but good results may be obtained by softening the biscuit material at 300° F., placing a slight excess in the mould and subjecting the same to 2700 pounds per square inch. The pressure is not released until the material has cooled to a temperature sufficiently low to be readily handled without deformation.

It is understood that this example in no way limits the method in which the desirable agent, polybasic organic acid or its anhydride, may be added in preparing the composition, nor as to its proportion, the use or manner in which the intermediate baking process is employed, the temperatures and pressures used, nor the use or form which the composition containing polybasic organic acid or its anhydride is to be put to service. All these conditions may be varied in order to obtain desired effects without impairing the product. Instead of asbestos, other types of fillers may be employed and suitable coloring agents may be added for specific purposes.

In the reaction of the polybasic organic acid or its anhydride, it would appear that condensation takes place between the acid groups of the added reagent and hydroxyl groups of different shellac molecules. Unquestionably the acid groups of the shellac molecules also partake in the reaction, but there is no reason to believe that the chemical reaction proceeds in a manner identical to that employed in the preparation of synthetic resins of the polybasic-acid-polyhydroxyl type, such as resins prepared from glycerine and phthalic anhydride. On the contrary, the space arrangements are unquestionably different and there is no reason to believe that predictions of properties of the resulting products can be based upon what is known with regard to the so-called "glyptal" types of resins.

Shellac to which phthalic anhydride has been added and subjected to heat may be used as a binding agent for a variety of materials or as a plastic cement. In this application, shellac is taken to include all forms of lac, the secretion of the insect *Tachardia lacca*, whether in the raw or refined, or manufactured forms. These products vary in their specific properties with varying amounts of the beneficial agent incorporated. Unlike the products disclosed in the U. S. patents above referred to, the amount of agent which can be employed with improved results is not limited to a small percentage, and increased beneficial results can be obtained by using amounts in excess of 1%.

Having described my invention, what I claim, and desire to secure by Letters Patent, is as follows:

1. A composition of matter comprising shellac and a polycarboxylic acid, as the sole reacting ingredients in proportion to raise the softening or fusion temperature of the heat reaction product of the shellac in said composition.

2. A molding mixture comprising shellac and a polycarboxylic acid, as the sole reacting ingredients.

3. A molding mixture comprising shellac and a phthalic acid, as the sole reacting ingredients.

4. A composition of matter formed by the application of heat to shellac and a polycarboxylic acid, as the sole reacting ingredients.

5. A composition of matter formed by the condensation of shellac and a polycarboxylic acid, as the sole reacting ingredients.

6. A method of making molding compositions which comprises adding to shellac a polycarboxylic acid, as the sole reacting agent, and heating.

WILLIAM HOWLETT GARDNER.